Aug. 25, 1970 M. DE VRIES 3,525,528

STEREOPHONIC PICK-UP

Filed July 17, 1962

Machiel de Vries
*INVENTOR.*

*BY*

Fisher, Christen, Sabol + Caldwell

United States Patent Office 3,525,528
Patented Aug. 25, 1970

3,525,528
STEREOPHONIC PICK-UP

Machiel de Vries, Amsterdam, Netherlands, assignor to Ronette Piezo Electrische Industrie, N.V., Amsterdam, Netherlands, a corporation of the Netherlands Filed July 17, 1962, Ser. No. 210,395
Claims priority, application Germany, Jan. 10, 1962, V 21,859
Int. Cl. H04r *1/16*; G11b *3/04*
U.S. Cl. 274—37 7 Claims

ABSTRACT OF THE DISCLOSURE

A stereophonic pick-up having a housing provided with two transducer elements and a common stylus holder. One end of the holder carries a stylus and the other end is mounted in a bearing accommodated in the housing. Each of the transducer elements are connected with a portion of the stylus holder by a resilient coupling member.

The present invention relates to a stereophonic pick-up comprising a housing provided with two transducer elements and a common stylus holder, on one end carrying a stylus and on the other end being mounted in a bearing accommodated in the housing, either of said transducer elements being connected with a portion of the stylus holder located between the end of the stylus holder by means of a resilient coupling member.

A difficulty experienced in pick-ups of this type is the correct positioning of the stylus holder relative to the coupling members. It may also occur in this known type of pick-up that in use, for example, as a result of shock, the coupling members become dislocated relative to the stylus holder. The coupling members may have a faulty position relative to the stylus holder in two directions, namely, they may be shifted either transversely or longitudinally of the stylus holder. In the first case there will be a change in the coupling between the stylus holder and the transducer elements, which may result in the walls of the grooves being insufficiently followed by the stylus or not at all. In the second case the composite vibrations taken up by the stylus will be incorrectly analyzed. A faulty positioning of the coupling members relative to the stylus holder may also be caused during the first assembly or on subsequent replacement of the stylus holder.

The invention has for its object to provide a pick-up in which it is not only very simple to bring the stylus holder precisely in the correct position, but in which it is moreover impossible for the coupling members to come to assume an incorrect position during subsequent use.

To that end, according to the invention, the pick-up is so arranged that a resilient tube is clampingly fitted around at least a portion of the stylus holder, one end of said tube being connected with the bearing and the other end being connected with the two coupling members.

The pick-up according to the invention may further be so arranged that the bearing, the tube and the coupling members are formed of one piece of resilient material.

The pick-up according to the invention may also be so arranged that the ends of the coupling members connected with the stylus holder are connected with the tube by means of a clamping tneon and mortise joint.

Finally, the pick-up according to the invention may be so arranged that either of the coupling members consists of a sleeve of resilient material fitted on to a transducer element and connected with a rigid, bar or tube-shaped, connecting member by means of a clamping tenon and mortise joint.

Some embodiments of the pick-up will be described with reference to the accompanying drawings, in which FIG. 1 is a schematic sideview of a pick-up according to the invention, part of one half of the housing being broken away;

Figure 1:
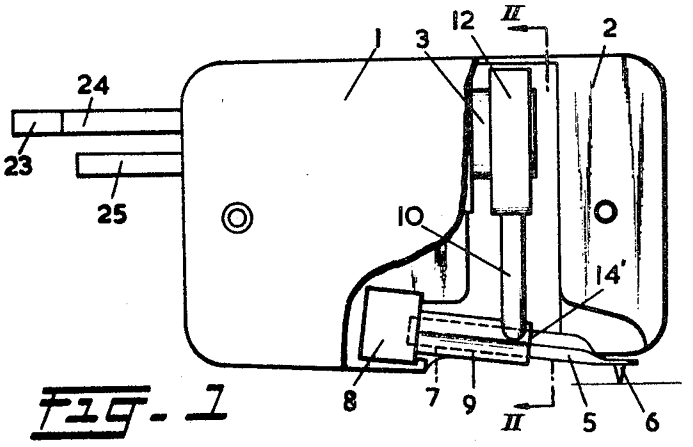
Figure 2:
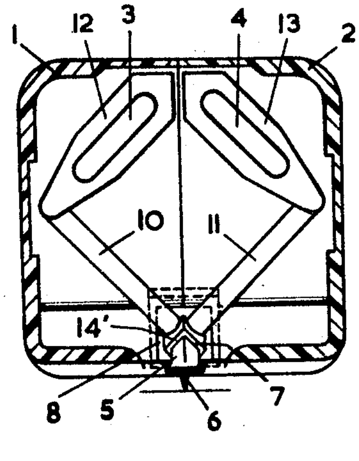
FIG. 2 is a schematic cross-section taken on the line II—II in FIG. 1.

FIG. 1 is a simplified illustration of a pick-up with a housing consisting of two halves 1 and 2. These halves 1 and 2 of the housing fit against each other with vertical faces. Part of that half of the housing which faces the reader has been broken away, so that part of the interior of the pick-up is visible. Number 3 of two piezo-electric transducer elements 3 and 4 is partly visible in FIG. 1. Elements 3 and 4 are secured in the housing in a conventional manner, which is not shown in the drawing. A stylus holder 5 is provided with a stylus 6 at one end. In the construction according to FIGS. 1 and 2, the stylus holder 5 is partly located within a cavity 7 formed in a member consisting of one piece of resilient material. This member consists of a block-shaped part 8, a tubular part 9, two arms 10 and 11 and two sleeves 12 and 13. The block-shaped part 8 is clamped in complementarily shaped recesses in the halves 1 and 2 of the housing. The tubular part 9, which is provided with the cavity 7, passes into the block-shaped part 8 at one end, and the other end, designated by 14′, forms the entrance to the cavity 7. At a short distance from the end 14′ of tube 9, the two arms 10 and 11 begin, the ends of which pass into sleeves 12 and 13.

As illustrated in FIG. 1, the passage 7 may reach a short distance into the block-shaped part 8. However, the passage 7 may also be formed in part 9 only. The stylus holder is of non-circular cross-sectional shape and the passage 7 is so formed as to be complementary thereto. Since, furthermore, the tubular part 9 is fixed relative to the block-shaped part 8, and the said part 8 in its turn, can only occupy one correct position relative to the housing, the stylus holder cannot be so rotated about its longitudinal axis as to permanently assume an improper position relative to the housing. Since, moreover, the arms 10 and 11 are fixedly connected with the tubular part 9, rotation of the stylus holder relative to the arms is not possible either. The exterior measurements of the stylus holder 5 and the measurements of passage 7 have been so chosen that the stylus holder is a slightly clamping fit in the tubular part 9. Consequently, once the stylus holder 5 is properly positioned in the tubular part 9, a certain force would be required to take it from its place again. This force will always exceed any longitudinal forces exercised on the stylus holder when the pick-up is in use. The stylus holder 5 is very easily put into its place in the tubular part 9. For when the end of the stylus holder 5 is introduced into the entrance of the passage 7, i.e. at the end 14 of the tubular part 9, the tubular part 9 is slightly shortened owing to the pressure exercised, which is accompanied with an expansion in transverse direction, as a result of which the tubular part becomes wider internally too.

The stylus holder is then easily slipped through to the end of the passage 7. If the stylus holder should then be subjected to a pulling force, the tubular part 9 is slightly elongated, which is accompanied with a narrowing of the passage 7, resulting in an additional clamping around the stylus holder 5. Since the arms 10 and 11 are fixedly connected with or form part of the tubular part 9, the stylus holder 5 and the arms 10 and 11 will always occupy the same relative positions lengthwise of the stylus holder.

Figure 3:
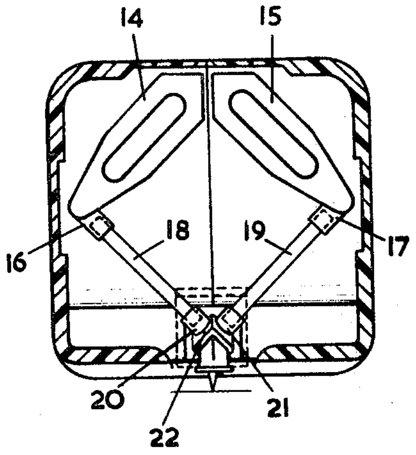
FIG. 3 is a cross-sction as shown in FIG. 2, in which, however, the coupling members are formed differently.

In FIG. 3 an alternative construction is illustrated. In this case the sleeves 14 and 15 each carry a hollow projection 16 and 17, respectively. These projections are fixedly secured to or form integrally with the sleeves, and are each slightly clampingly fitted on to one of the ends of rigid arms 18 and 19. The latter may be either hollow or bar-shaped. The other ends of arms 18 and 19 are fitted into similar hollow projections 20 and 21, secured to or forming part of a tubular part 22, which, for that matter, is of similar construction as the tubular part 9 described hereinbefore, and accordingly also has a block-shaped end. An additional advantage of this construction is that the material of which the sleeves 14 and 15 are made may by different from the material chosen for the tubular part 22 and its block-shaped end.

In FIG. 1 connecting terminals of conventional construction, for use in electrically connecting the pick-up, are shown at 23, 24 and 25.

I claim:

1. In binaural pickups, a housing, two elongated piezoelectric transducers mounted at their one ends in the housing in spaced parallel horizontal relationship, a single elongated stylus holder, and coupling means operatively connecting the stylus holder with the other end of each of the transducers, said coupling means including an elongated block portion, a pair of sleeves and a pair of arms, said block portion being molded of resilient material and including an integrally formed forwardly extending element having a cavity open at the forward end frictionally receiving one end of the stylus holder, said sleeves being molded of resilient material and being respectively secured to the other ends of the transducers, each of said arms having one end connected with the forward end of the elongated element of the block and having their respective other ends each connected with a single one of said sleeves, the rear end of said block portion being secured by the housing.

2. The invention as defined in claim 1, wherein said block, sleeves and arms are integrally formed of resilient material.

3. The invention as defined in claim 1, wherein said arms are made of rigid material.

4. The invention as defined in claim 3, wherein said elongated element and said sleeves are provided with hollow projections frictionally receiving the respective ends of said arms.

5. The invention as defined in claim 1, wherein the cross-sectional configuration of the cavity in the elongated element and the stylus holder are complementary and non-circular, whereby the relative rotational position of the stylus holder will be maintained.

6. The invention as defined in claim 5, wherein said cross-sectional configuration of said cavity and stylus holder is rectangular.

7. A pick-up including two electromechanical transducers with resilient coupling parts near their driving positions, a scanning needle connected with a resilient coupling part, two webs comprised of material practically rigid relative to the deformation forces arising during scanning, each embedded with its end in the resilient coupling part of one transducer and with the other end in the resilient coupling part connected to the scanning needle, the direction of the webs being selected in each case corresponding approximately to the two modulation directions to be scanned with the pick-up.

References Cited

UNITED STATES PATENTS

| | | | |
|---|---|---|---|
| 3,113,783 | 12/1963 | Zimmermann et al. ---- | 274—37 |
| 3,136,555 | 6/1964 | De Vries ------------ | 274—37 |

FOREIGN PATENTS

| | | |
|---|---|---|
| 220,559 | 1/1959 | Australia. |

NORTON ANSHER, Primary Examiner

J. F. PETERS, Jr., Assistant Examiner

U.S. Cl. X.R.

179—100.41